(12) United States Patent
Rheinschmitt et al.

(10) Patent No.: US 8,369,439 B2
(45) Date of Patent: Feb. 5, 2013

(54) TRANSMISSION OF PRECODING CODEBOOK OVER AN AIR INTERFACE

(75) Inventors: Rupert J. Rheinschmitt, Korntal (DE); Christian G. Gerlach, Ditzingen (DE); Thorsten Wild, Stuttgart (DE); Howard Huang, New York, NY (US); Matthew P. J. Baker, Canterbury (GB)

(73) Assignee: Alcatel Lucent, Paris (FR)

( * ) Notice: Subject to any disclaimer, the term of this patent is extended or adjusted under 35 U.S.C. 154(b) by 412 days.

(21) Appl. No.: 12/585,976

(22) Filed: Sep. 30, 2009

(65) Prior Publication Data

US 2011/0075746 A1     Mar. 31, 2011

(51) Int. Cl.
*H04B 7/02* (2006.01)
(52) U.S. Cl. ....................................................... 375/267
(58) Field of Classification Search .................. 375/260, 375/267
See application file for complete search history.

(56) References Cited

U.S. PATENT DOCUMENTS

| | | | |
|---|---|---|---|
| 2008/0165876 A1* | 7/2008 | Suh et al. | 375/262 |
| 2008/0260059 A1 | 10/2008 | Pan | |
| 2008/0299917 A1 | 12/2008 | Alexiou et al. | |
| 2009/0323840 A1* | 12/2009 | Lee et al. | 375/260 |
| 2010/0027713 A1* | 2/2010 | Huang et al. | 375/296 |
| 2010/0046461 A1 | 2/2010 | Wennstrom | |
| 2010/0202553 A1* | 8/2010 | Kotecha et al. | 375/267 |

FOREIGN PATENT DOCUMENTS

WO   WO 2008/131593   11/2008

OTHER PUBLICATIONS

International Search Report dated Feb. 14, 2011 in corresponding International Application No. PCT/US2010/050521.

* cited by examiner

*Primary Examiner* — Don N Vo
(74) *Attorney, Agent, or Firm* — Harness, Dickey & Pierce, P.L.C.

(57) ABSTRACT

Embodiments of the present invention include a system for transmitting a precoding codebook over an air interface. The system includes a first station configured to signal a set of indicators via at least one antenna to a second station from which the precoding codebook is derived at the second station based on the signaled set of indicators. The set of indicators includes less information than the precoding codebook.

23 Claims, 7 Drawing Sheets

TRANSMISSION OF PRECODING CODEBOOK OVER AN AIR INTERFACE

BACKGROUND

Base stations in wireless communication systems provide wireless connectivity to users within the geographic area, or cell, associated with the base station. The wireless communication links between the base station and each of the users typically include one or more downlink (or forward) channels for transmitting information from the base station to the mobile unit and one or more uplink (or reverse) channels for transmitting information from the mobile unit to the base station. Multiple-input-multiple-output (MIMO) techniques may be employed when the base station and, optionally, the user terminals include multiple antennas. For example, a base station that includes multiple antennas can transmit multiple independent and distinct signals to multiple users concurrently and on the same frequency band. MIMO techniques are capable of increasing the spectral efficiency of the wireless communication system approximately in proportion to the number of antennas available at the base station.

It is well known that using a plurality of antennas instead of one antenna adds an additional spatial multiplex dimension to the communication system. One way to exploit the spatial dimension of multiple antennas in a MIMO system is to multiply complex weights to signals before transmitting the signals over each of the individual antennas of the multiple antennas at the base station. The complex weights are arranged in vectors, in which the vectors of complex weights form matrices. A set of matrices defined in a specific application scenario is called a codebook. An application scenario is related to a variety of parameters influencing the optimal codebook. Such parameters include antenna configuration parameters such as spacing and polarization and parameters characterizing the radio channel such as vehicular speed and scattering environment, for example. The operation performed on the signal before being transmitted from the base station is called precoding. Codebooks form an integral part of current mobile radio standards such as the first version ("Release 8") of long term evolution (LTE) of the universal mobile telecommunication system (UMTS), as well as Worldwide Interoperability for Microwave Access (WiMAX) and Ultra Mobile Broadband (UMB), for example. The selection of an appropriate codebook is a function of the effective scenario and may vary over time. The effective scenario is a function of a large variety of parameters such as antenna configuration and radio environment and in a mobile radio environment that changes over time. As a consequence, the optimal codebook is also a function of time.

In order to deal with a large variety of scenarios (e.g., antenna configurations, and radio propagation channel conditions) encountered in real-world scenarios, a codebook may have to be changed or modified. Therefore, the possibility for mobile terminals to download a codebook used for precoding by base stations has been proposed for various applications in order to cope with all kinds of channel and antenna scenarios. The Ultra-Mobile Broadband standard developed in 3GPP2 includes downloadable codebooks. However, the signaling procedures by which such downloads are accomplished are cumbersome. For example, conventional methods of downloading codebooks must transmit a complex number for every element of every matrix in the codebook.

SUMMARY

The present invention relates to a system for transmitting a precoding codebook over an air interface. The system includes a first station configured to signal a set of indicators via at least one antenna to a second station from which the precoding codebook is derived at the second station based on the signaled set of indicators. The set of indicators includes less information than the precoding codebook. The first station may be a base station, and the second station may be a user device, or vice versa.

In one embodiment, the set of indicators includes a first set of codewords such that a second set of codewords can be derived at the second station based on a mirror operation.

In another embodiment, the set of indicators includes a sub-set of complex elements of the precoding codebook, where each complex element of the sub-set has a predefined magnitude or phase.

In another embodiment, the set of indicators includes a sub-set of complex elements of the precoding codebook, where the complex elements of the sub-set are dependent upon each other. The at least one antenna may include a plurality of antennas. For example, a first antenna of the plurality of antennas is assigned a first antenna weight and a subsequent antenna is assigned a second weight. The second weight is a function of the first antenna weight and an antenna weight of a preceding antenna. The function may be a product, or a relationship such that the ratio of the second weight and the first weight is equal to the ratio of the first weight and the preceding antenna weight.

In another embodiment, the set of indicators includes a base phase for one of the plurality of antennas and an offset phase for other antennas of the plurality of antennas.

In another embodiment, the precoding codebook is a hierarchical codebook and the set of indicators includes an indicator indicating a level of a hierarchy and a set of matrices among matrices comprising the indicated level. The plurality of antennas may be a linear array or a circular array, for example. Also, the set of indicators may include an indicator to a first codebook and at least one indicator to at least one other codebook such that the hierarchical codebook can be derived based on a composition operation between the indicator to the first codebook and the at least one indicator to the at least one other codebook.

Embodiments of the present invention also include a system for receiving a precoding codebook over an air interface from a first station. The system may include a second station configured to derive the precoding codebook based on a set of indicators received at the second station from the first station. The set of indicators includes less information than the precoding codebook.

In one embodiment, the second station derives a second set of codewords from the set of indicators being a first set of codewords based on a mirror operation.

In another embodiment, the second station derives the precoding codebook from the set of indicators being a sub-set of complex elements of the precoding codebook, where each complex element of the sub-set has a predefined magnitude or phase resolution.

In another embodiment, the second station derives the precoding codebook from the set of indicators being a sub-set of complex elements of the precoding codebook, where the complex elements of the sub-set are dependent upon each other.

In another embodiment, the precoding codebook is a hierarchical codebook and the second station derives the hierarchical codebook from the set of indicators being an indicator indicating a level of a hierarchy and a set of matrices among matrices comprising the indicated level. Also, the set of indicators may include an indicator to a first codebook and at least one indicator to at least one other codebook, and the second station derives the hierarchical codebook based on a composition operation between the indicator to the first codebook and the at least one indicator to the at least one other codebook.

Embodiments of the present invention also include a method for transmitting a precoding codebook over an air interface from a first station. The method includes signaling a set of indicators from the first station via at least one antenna to a second station from which the precoding codebook is derived at the second station based on the signaled set of indicators. The set of indicators includes less information than the precoding codebook.

Example embodiments of the present invention also include a method for receiving a precoding codebook over an air interface from a first station. The method includes deriving at a second station the precoding codebook based on a set of indicators received at the second station from the first station. The set of indicators includes less information than the precoding codebook.

In one embodiment, the deriving step includes deriving a second set of codewords from the set of indicators being a first set of codewords based on a mirror operation.

In another embodiment, the deriving step includes deriving the precoding codebook from the set of indicators being a sub-set of complex elements of the precoding codebook, where each complex element of the sub-set has a predefined magnitude or phase resolution.

In another embodiment, the deriving step includes deriving the precoding codebook from the set of indicators being a sub-set of complex elements of the precoding codebook, where the complex elements of the sub-set are dependent upon each other.

In another embodiment, the precoding codebook is a hierarchical codebook and the deriving step includes deriving the hierarchical codebook from the set of indicators being an indicator indicating a level of a hierarchy and a set of matrices among matrices comprising the indicated level. Also, the set of indicators may include an indicator to a first codebook and at least one indicator to at least one other codebook, where the deriving step derives the hierarchical codebook based on a composition operation between the indicator to the first codebook and the at least one indicator to the at least one other codebook.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EMBODIMENTS

Various embodiments of the present invention will now be described more fully with reference to the accompanying drawings in which some embodiments of the invention are shown. Like numbers refer to like elements throughout the description of the figures.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Embodiments of the prevent invention relate to reliable and efficient transmission of codebooks by utilizing signaling techniques, where redundancies that exist in codebook entries are reduced. As a result, an amount of data representing the codebook that is transmitted to a user device from a base station is reduced.

Figure 1:
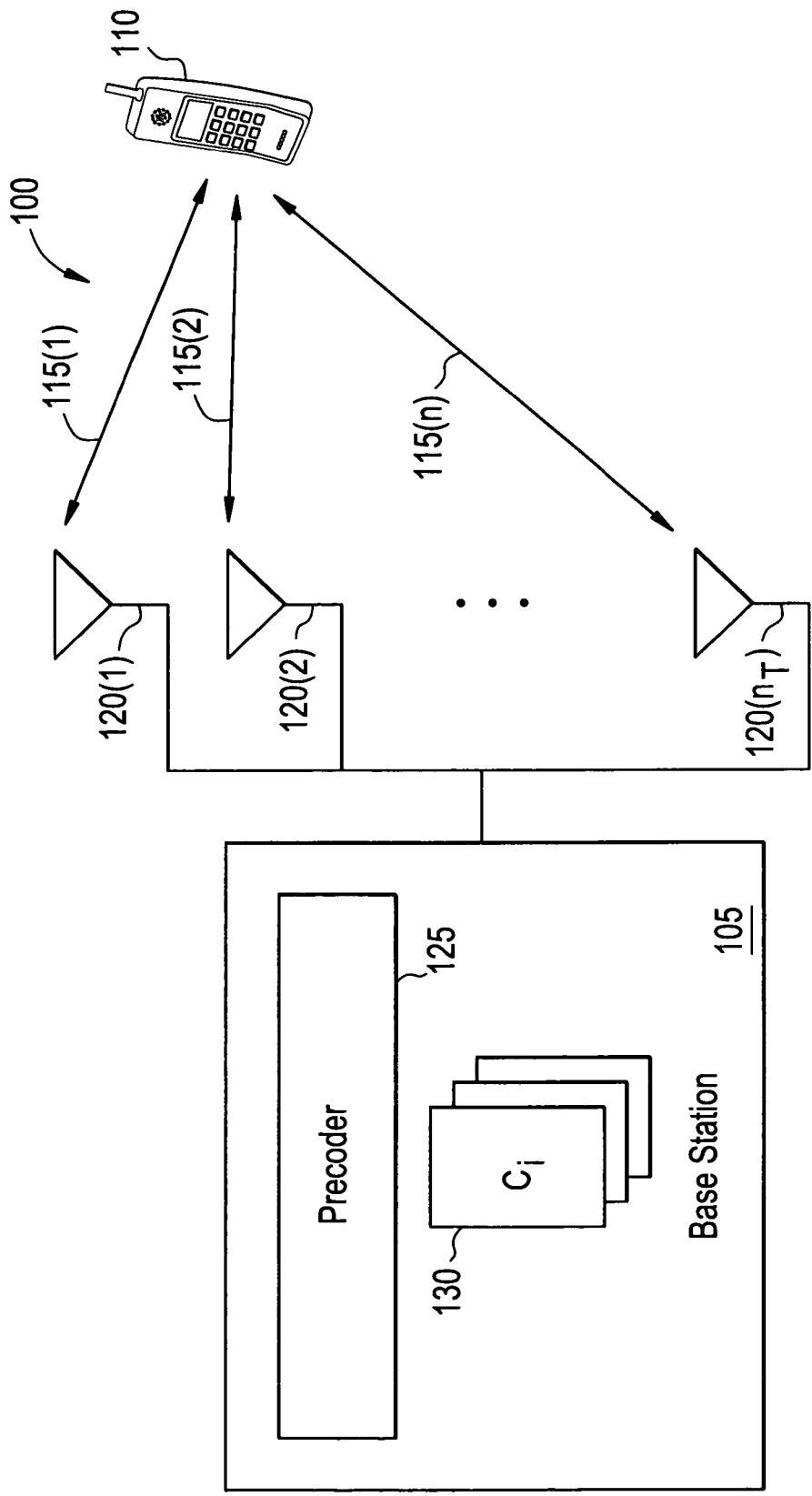
FIG. 1 illustrates a wireless communication system according to an example embodiment of the present invention.

FIG. 1 illustrates a wireless communication system 100 according to an embodiment of the present invention.

The wireless communication system 100 includes a base station 105 that provides wireless connectivity to one or more users 110 (only one shown in FIG. 1) over corresponding air interfaces 115 (e.g., 115(1)-115(n)). However, persons of ordinary skill in the art should appreciate that the present disclosure is not limited to wireless communication systems 100 that use base stations 105 to provide wireless connectivity. In alternative embodiments, the wireless communication system 100 may use other devices to provide wireless connectivity, such as base transceiver stations, base station routers, WiMAX or WiFi access points, access networks, and the like. The user 110 may include but is not limited to a user equipment (EU), a mobile station, a fixed or mobile subscriber unit, a pager, a cellular telephone, a personal digital assistant (PDA), a computer, or any other type of user device capable of operating in a wireless environment.

Techniques for establishing, maintaining, and operating air interfaces 115 to provide uplink and/or downlink wireless communication links between the base station 105 and the users 110 are known in the art and in the interest of clarity only those aspects of establishing, maintaining, and operating the air interfaces 115 that are relevant to the present disclosure will be discussed herein.

The base station 105 includes multiple antennas 120 for transmitting and/or receiving information over the air interfaces 115. Although three antennas 120 (e.g., 120(1), 120(2), 120($n_T$)) are depicted in FIG. 1, persons of ordinary skill in the art should appreciate that the base station 105 is not limited to any particular number of antennas 120. Moreover, persons of ordinary skill in the art should appreciate that, in some embodiments, the users 110 may also include multiple antennas. The base station 105 may therefore employ multiple-input-multiple-output (MIMO) techniques so that the multiple antennas 120 can transmit multiple independent and distinct signals to the users 110 concurrently and on the same frequency band using spatially multiplexed channels of the air interfaces 115.

The base station 105 includes a precoder 125 that maps signals to be transmitted to each user 110 onto the available channels using pre-coding matrices associated with the user 110. The precoding matrix is generated based on feedback, for example, the vector quantization feedback obtained from each user 110. Other forms of feedback other than vector quantization are well within example embodiments of the present invention. For example, the feedback may include an index of an entry in a codeword table. The base station 105 may therefore store codebooks 130 of matrices, Ci, associated with each user 110 that is connected to the base station 105. The codebooks 130 include complex weights that are arranged in vectors, in which the vectors of complex weights form matrices. A set of matrices defined in a specific application scenario is called a codebook. In the case of uplink precoding, the user 110 can also include the precoder 125. In such a case, the user 110 may map signals to be transmitted to the base station 105 onto the available channels using pre-coding matrices.

Table 1, depicted below, illustrates an example of a codebook for two antennas with four entries. As a result, the codebook illustrated below includes four precoding vectors (or "codewords"). The parameters $\theta_1 \ldots \theta_4$ can be interpreted as directions in the case of $\lambda/2$ element spacing between the two antennas, for example.

TABLE 1

Example codebook for 2 transmit antennas

| Beam Index | Weight 1: $w_1$ | Weight 2: $w_2$ |
|---|---|---|
| 1 | 1 | $\exp(-j\pi \sin(\theta_1))$ |
| 2 | 1 | $\exp(-j\pi \sin(\theta_2))$ |
| 3 | 1 | $\exp(-j\pi \sin(\theta_3))$ |
| 4 | 1 | $\exp(-j\pi \sin(\theta_4))$ |

Each of the codewords may include at least two weights: $w_1$ and $w_2$. In this example, $w_1$ has a value of 1 for each of the beam indices. The values for $w_2$ depend on the element spacing of the antennas. Each of the codewords may also include a beam index number associated with weights $w_1$ and $w_2$. The example codebook depicted in Table 1 is for illustrative purposes only, where other types of codebooks are well within the embodiments of the present invention. For instance, codebooks of the present disclosure encompass any number of weights and/or values associated with each weight.

Referring back to FIG. 1, the system may start with a predefined fixed codebook known at both the user 110 and the base station 105 of the communication link in order to be able to use precoding techniques before the codebook download. Thereafter, the base station 105 transmits the codebooks 130 over an air interface to each user 110 in order for the user to first generate feedback information based on the transmitted codebook and subsequently to receive signals precoded with an entry of the transmitted codebook 130. For example, the user 110 may transmit feedback bits representative of the selected codebook and/or codeword to the base station 105, which may transmit information to the user 110 using precoding matrices determined based on the feedback from the user 110 and any other users in the system 100. The base station 105 may use the additional feedback provided by each user 110 to update the codewords and/or codebook associated with each user 110.

However, before transmission of the set of codebooks 130, the base station 105 compresses the codebook for efficient transmission to the user 110. Similarly, the user 110 may compress the codebook for transmission to the base station 105. The base station 105 signals a set of indicators from which the entire codebook may be uniquely derived. The set of indicators includes less information than the information of the entire codebook. As a result, the amount of the signaling is substantially reduced compared to explicit signaling of the entire codebook. Different types of compression for precoding codebooks are described below according to embodiments of the present invention.

Figure 2:
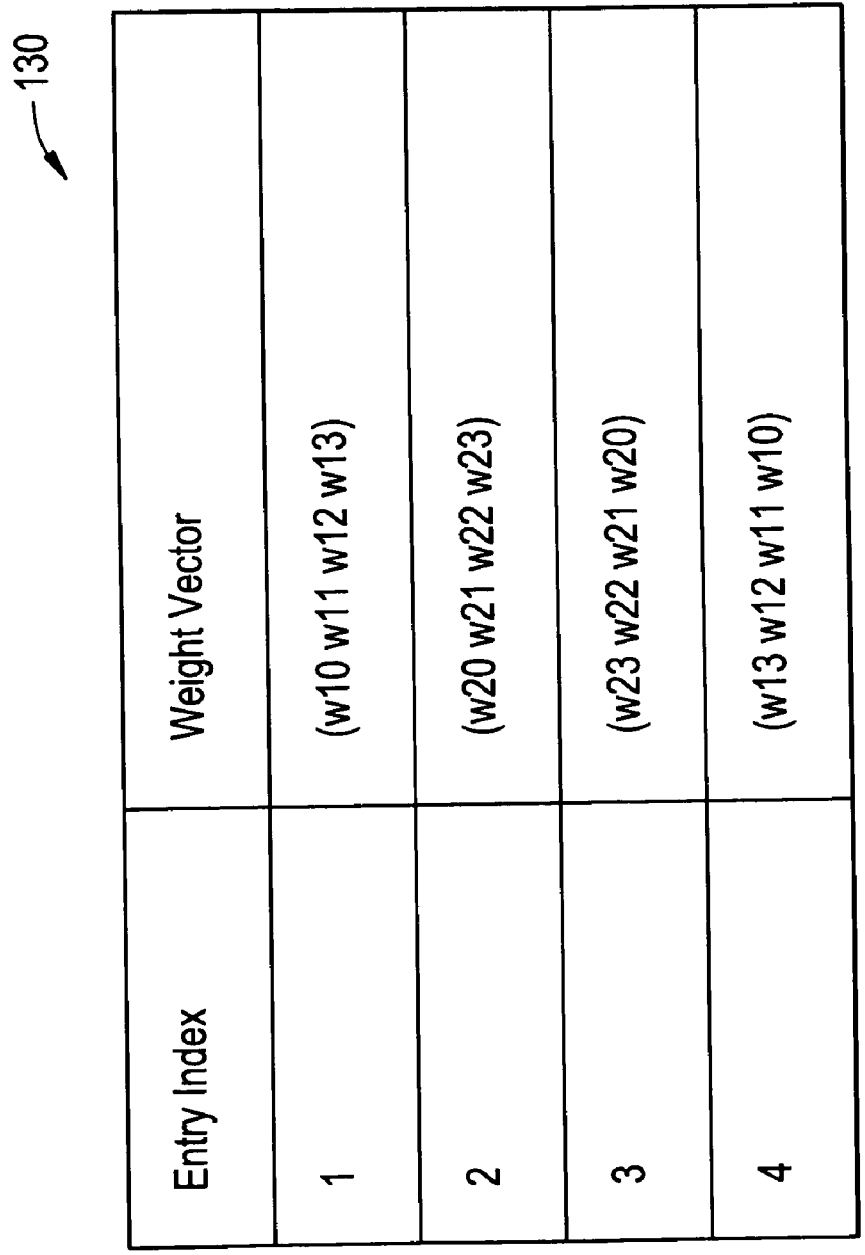
FIG. 2 illustrates an example of a codebook to be compressed based on a mirror operation according to an embodiment of the present invention.

FIG. 2 illustrates an example of a codebook 130 to be compressed based on a mirror operation according to an embodiment of the present invention. For example, FIG. 2 shows four codewords, where each codeword is associated with an entry index number. Each codeword includes a plurality of weights (or elements) comprising a weight vector. For example, the codeword associated with entry index 1 includes weight vector W10, W11, W12 and W13.

According to this embodiment, the base station 105 of FIG. 1 signals a first set of codewords of the codebook 130 to the user 110 via the plurality of antennas 120. The first set of codewords represents only a portion of the codebook 130. A second set of codewords is obtained at the user 110 by mirroring the first set of codewords. As a result, the base station 105 only transmits part of the codebook 130, whereas the entire codebook 130 may be obtained at the user 110 based on a mirroring operation, which is explained below.

For example, the codebook 130 may be separated into a first set of codewords and a second set of codewords. If the total number of codewords equals K, the codewords of the codebook 130 may be divided into two sets of K/2 codewords, where each half is associated with the first and second sets, respectively. The second set of codewords is assigned to be "mirrors" of the first set of codewords, or vice versa, based on symmetries associated with the plurality of antennas 120, which are explained with reference to FIG. 3. In the example of FIG. 2, the weight vectors associated with entry indices 3 and 4 are assigned to be "mirrors" of the weight vectors associated with entry indices 1 and 2. In this example, the base station 105 signals the first set of codewords associated with entry indices 1 and 2, and the user 110 receives the codewords associated with entry indices 1 and 2, and obtains the second set of codewords associated with entry indices 3 and 4 based on the mirroring operation, which is explained below.

After the user 110 receives the codewords associated with entry indices 1 and 2, the user 110 mirrors these codewords by reversing the elements in the first set of codewords. For example, the weight vector associated with entry index 1 includes weights W10, W11, W12, W13. The user 110 would obtain the codeword associated with entry index 4 by flipping the elements of "W10, W11, W12, W13" to obtain W13, W12, W11, and W10, which is the codeword associated with entry index 4. The same operation is performed on the codeword associated with entry index 2 to obtain the codeword associated with entry index 3. As a result, the base station 105 transmits a set of indicators, which represents approximately half of the entire codebook 130, and the user 110 is able to obtain the other half based on the mirroring operating described above. Also, this mirror operation can also exploit symmetries in the overall codebook matrix, which may be of hermitian nature, thus being equal to its conjugate transpose. For example.

Figure 3:
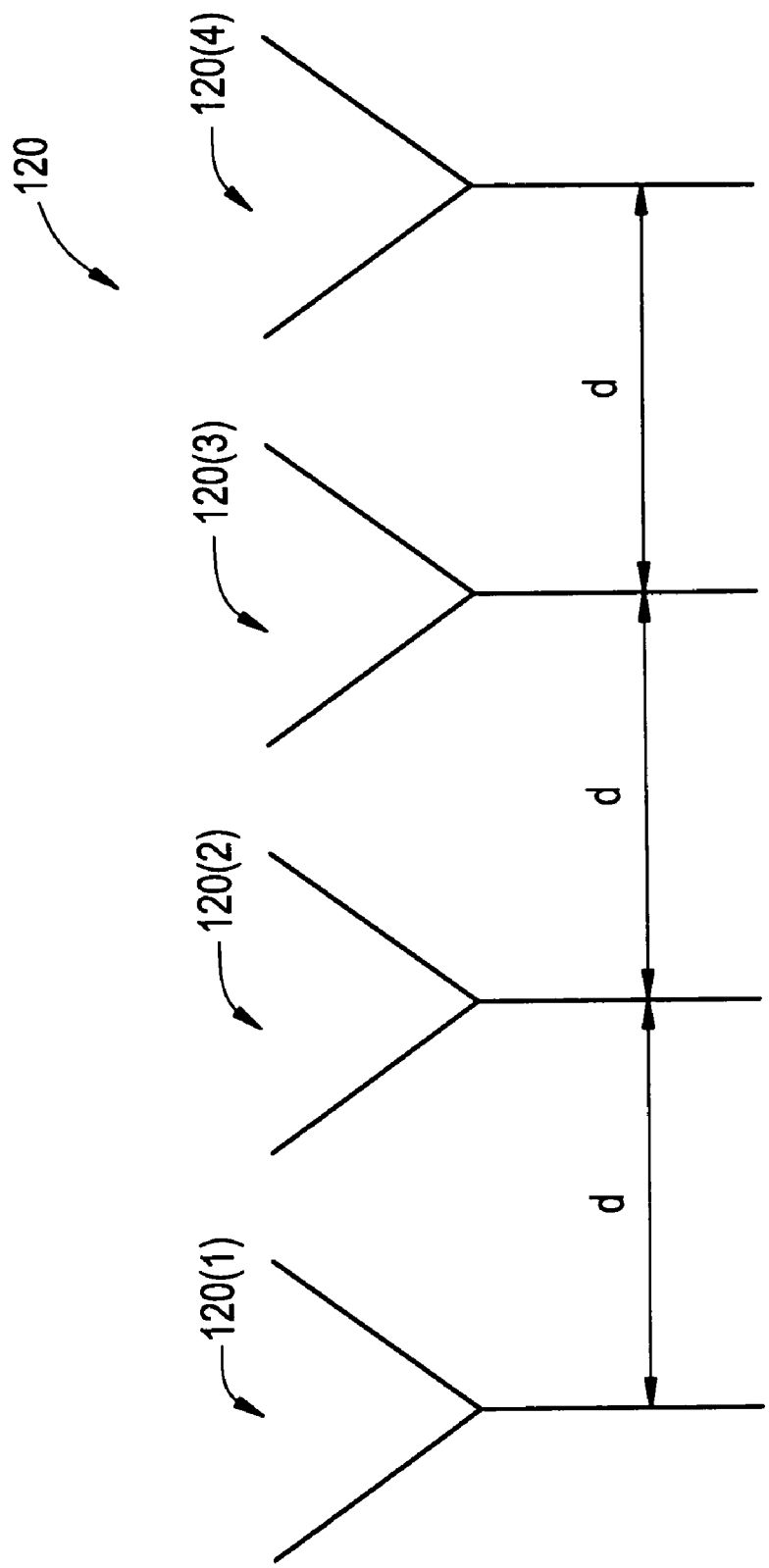
FIG. 3 illustrates a linear array of antennas according to an embodiment of the present invention.

FIG. 3 illustrates a linear array of antennas according to an embodiment of the present invention. The linear array of antennas includes a plurality of antennas 120-antenna 120(1), antenna 120(2), antenna 120(3), and antenna 120(4), where each antenna is separated by a distance d. The plurality of antennas 120 may be used in a MIMO system as explained above. Each of the plurality of antennas 120 includes antennas weights used during precoding at the precoder 125. The codewords of the codebook 130 are based on the antenna weights of the plurality of antennas 120. Because antenna 120(1) and antenna 120(2) may be symmetrical with antenna 120(4) and antenna 120(3), the antenna weights of antennas 120(3) and 120(4) may be mirrors of antennas 120(2) and 120(1). These symmetries are exploited in order to efficiently transmit a codebook 130 to the user 110. Embodiments of the present invention are not only limited to a linear array of antennas, but may also encompass other types of antenna arrangements that exhibit symmetrical features such as a circular array of antennas or cross-polarized antennas, for example.

According to another embodiment of the present invention, the base station 105 signals a sub-set of complex elements of the codebook 130, where each of the complex elements within the sub-set has a certain predefined magnitude and/or phase. For example, the base station 105 signals a set of indicators from which the entire codebook may be uniquely derived. The set of indicators includes less information than the information of the entire codebook. As a result, the amount of the signaling is substantially reduced compared to explicit signaling of the entire codebook. The complex elements may be quadrature amplitude modulation (QAM) and/ or phase-shift keying (PSK) symbols, for example. For instance, the individual elements of the vectors and matrices constituting the codebooks 130 are complex numbers. Although complex numbers from the whole complex plane may be used as elements in codebooks, the elements of the codewords are often taken from a limited set of complex numbers called the alphabet, for example. This alphabet is based on a well-known modulation system. Because the used alphabet is finite, the set of complex numbers used for downloading the codebook may be indexed. As a result, whereas the alphabet is transmitted in high resolution or is predefined, the actual codebook and respective scaling factors are transmitted as a set of indices thereby reducing the amount of information needed for transmission. The user 110 derives the entire codebook 130 based on the sub-set of complex elements through demodulation.

Figure 4:
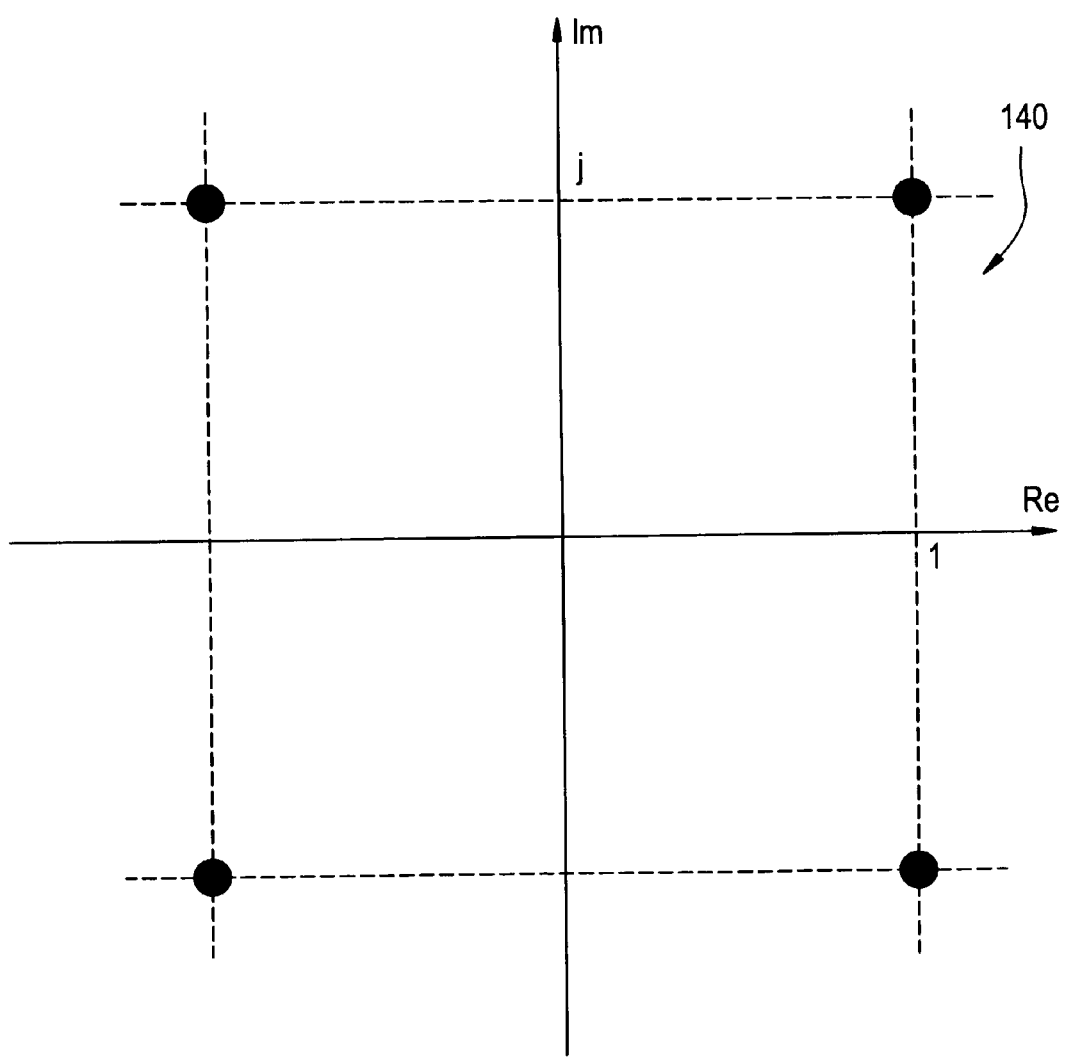
FIG. 4 illustrates an example of a QPSK system featuring symbols with equal magnitude according to an embodiment of the present invention.

FIG. 4 illustrates an example of a quadrature phase-shift keying (QPSK) system 140 featuring symbols with equal magnitude according to an embodiment of the present invention. In this example, the individual elements of the entire codebook are taken from the set of 4 complex numbers as defined in FIG. 4. As a result, the amount of information typically needed for the transmission of each element of the codebook 130 may be reduced to only two bits. Namely, each complex element is represented by a different two bit combination. The two bits represents an index in the sub-set of complex elements signaled from the base station 105 to each user 110, where the sub-set of elements includes four complex numbers, as shown in FIG. 4.

Figure 5:
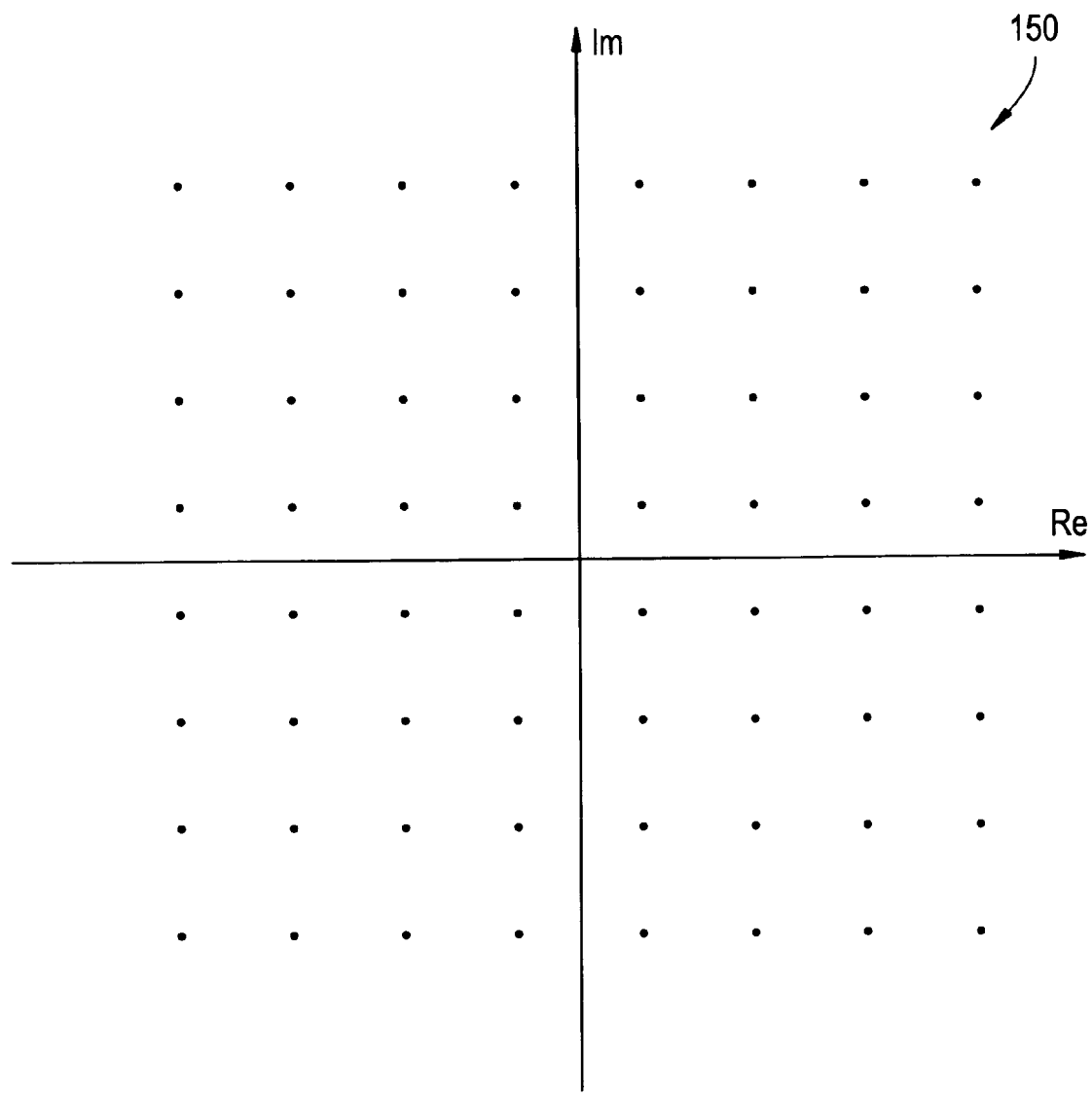
FIG. 5 illustrates a 64QAM system according to an embodiment of the present invention.

FIG. 5 illustrates a 64QAM system 150 according to an embodiment of the present invention. In this example, the individual elements of the entire codebook are taken from the set of 64 complex numbers as defined in FIG. 5. As a result, the amount of information typically needed for the transmission of each element of the codebook 130 may be reduced to only six bits. Each possible combination of the six bits represents the sub-set of complex elements signaled from the base station 105 to each user 110, where the sub-set of elements may include at least the 64 complex numbers, as shown in FIG. 5. It will be appreciated that the compression techniques of FIGS. 4 and 5 may be applied to other forms of modulation besides QPSK and 64QAM.

According to another embodiment of the present invention, the base station 105 signals a sub-set of elements within codewords of a codebook, where elements of the transmitted sub-set are dependent on each other. Based on this dependency, the user 110 may obtain the entire codebook. For example, the base station 105 signals a set of indicators from which the entire codebook may be uniquely derived. The sub-set of complex elements includes less information than the information of the entire codebook. This operation is further explained with reference to FIG. 6.

Figure 6:
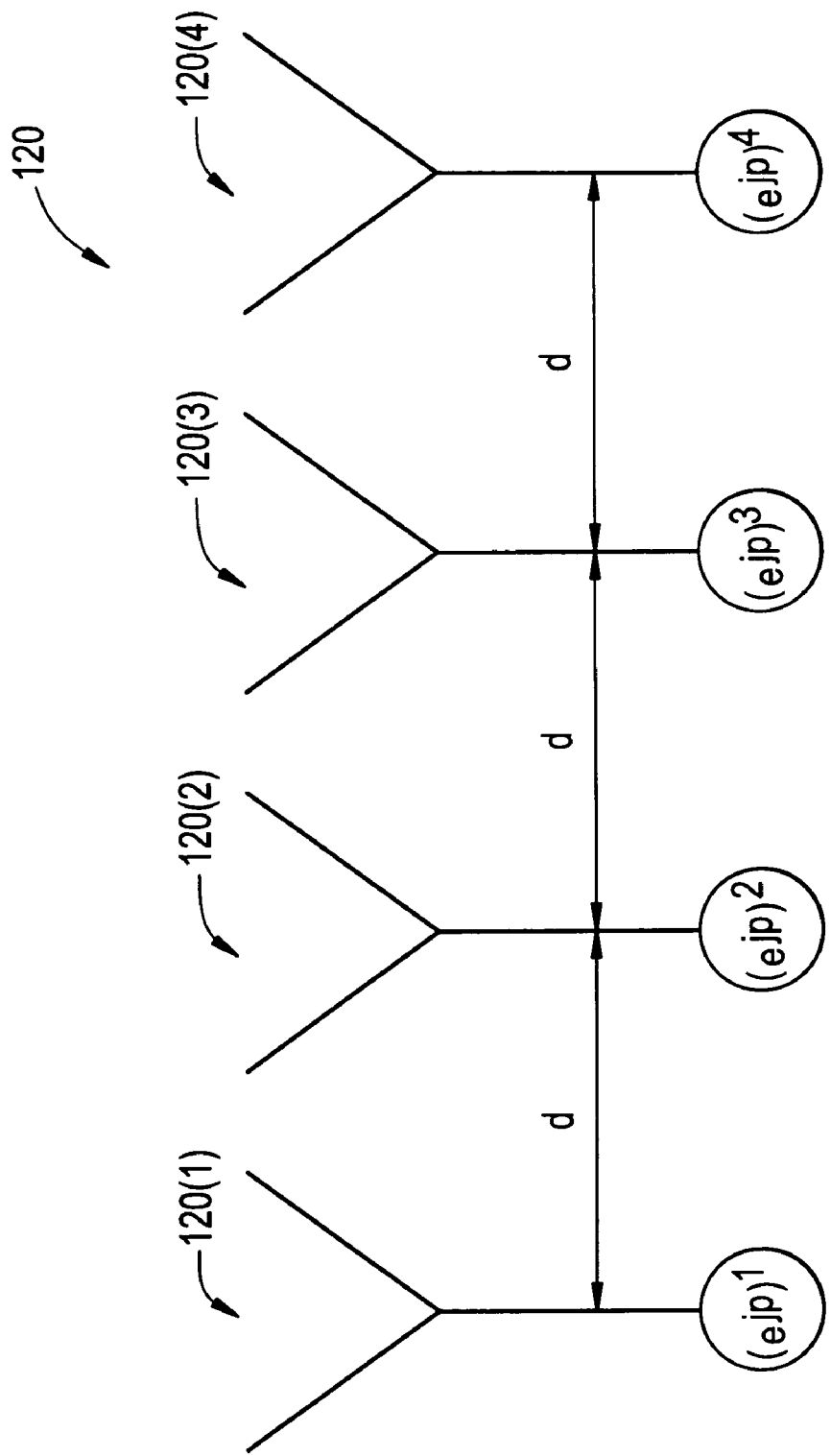
FIG. 6 illustrates a linear array of antennas with complex weighting according to an embodiment of the present invention.

FIG. 6 illustrates a linear array of antennas with complex weighting according to an embodiment of the present invention. The linear array of antennas includes a plurality of antennas 120, where each of the plurality of antennas 120 is separated by equal distance, as indicated by distance d. According to this embodiment, the first antenna 120(1) may be assigned a specific antenna weight. The antenna weights of each of the subsequent antennas are gained by (another) multiplication of the first antenna weight to the weight of the preceding antenna. Although FIG. 6 illustrates specific antenna weights for each of the plurality of antennas 120, any type of complex value of the first antenna weight and any other algorithm providing the remaining antenna weights are well within the embodiments of the present invention.

Based on this arrangement shown in FIG. 6, the base station 105 only has to transmit a subset of elements in a codebook. For example, referring to FIG. 6, the base station 105 may signal elements of associated with antenna 120(1). The user 110 obtains the entire codebook by appropriately modifying the transmitted elements associated with antenna 120(1) to obtain the other elements associated with antennas 120(2) to 120(4).

According to another embodiment of the present invention, the base station 105 may signal a starting phase for one of the plurality of antennas 120 and signal incremental relative phase shifts for all neighbor array elements. For example, the base station 105 signals a set of indicators being a base phase for one antenna and an offset phase for the other antennas from which the entire codebook may be uniquely derived. The set of indicators includes less information than the information of the entire codebook. As a result, the amount of the signaling is substantially reduced compared to explicit signaling of the entire codebook. For example, a base antenna may be assigned with a base phase ph1, whereas the phase offset for the next antenna in one dimension or next antennas in additional dimensions may be provided with an offset phase delta_ph2. The distinct antenna is predetermined between the base station 105 and each user 110. The user 110 may compute the precoding weights for the entire codebook based on the beam direction and antenna spacing (relative to the carrier wavelength) using standard geometrical procedures. For the special case of channels with relatively low angle spread, phase shifts could be designed to relate directly to the direction of the resulting beam following standard geometrical procedures. Therefore, the set of indicators being signaled from the base station 105 to each user 110 may include a base phase for one of the plurality of antennas and an additional offset for the other plurality of antennas. The user 110 may obtain the entire codebook 130 based on the base phase for one of the plurality of antennas and the additional offset for the other plurality of antennas.

According to another embodiment of the present invention, the codebooks 130 may be a hierarchical codebook, as explained in U.S. patent application Ser. No. 11/754,624, filed May 29, 2007, which is incorporated by reference in its entirety herein. In other words, the codebooks 130 associated with each user 110 may be part of the hierarchical codebook 130, e.g., each codebook is a part of a level 1 of the hierarchical codebook 130 that has L levels, where 0<or=l<or=L. The hierarchical codebook 130 is organized such that each of the matrices in a relatively low level is associated with one of the matrices in the next higher level.

Figure 7:
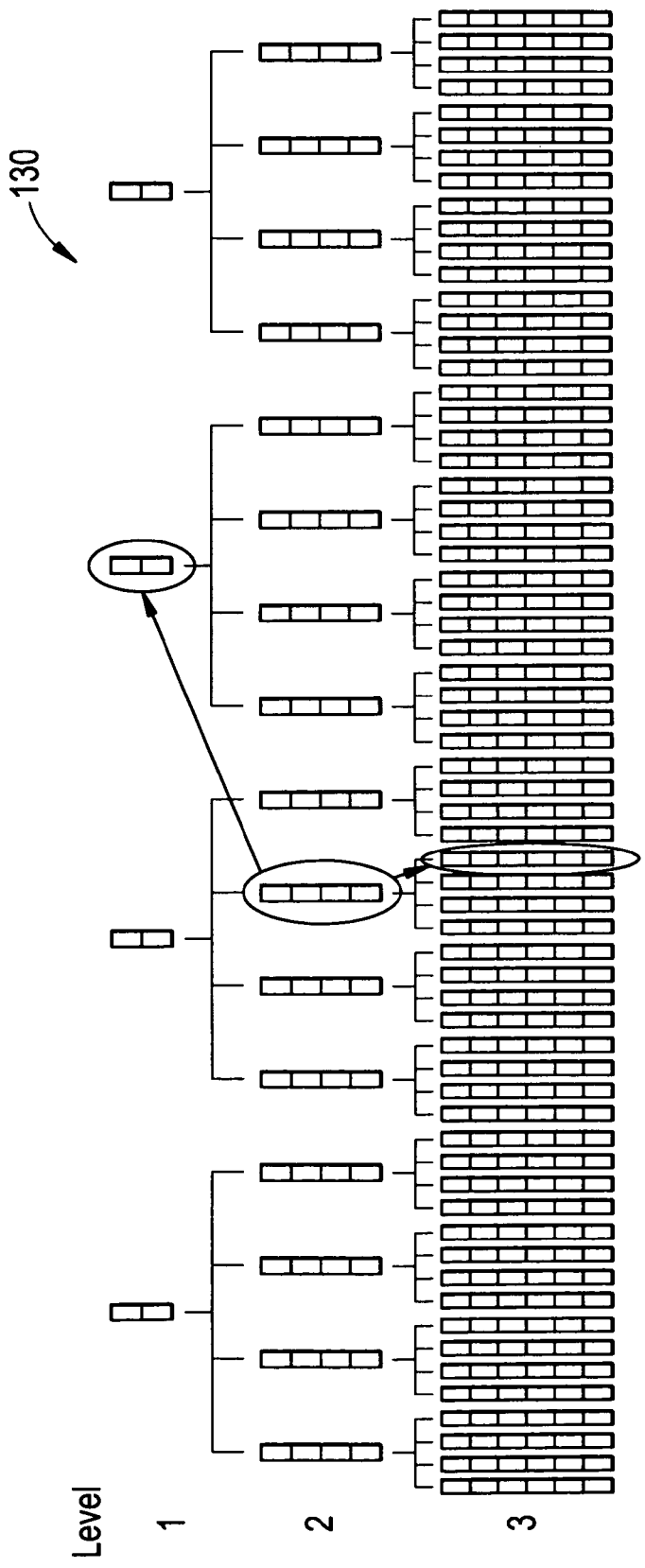
FIG. 7 illustrates an embodiment of the hierarchical codebook according to the present invention.

FIG. 7 illustrates an embodiment of the hierarchical codebook 130. Referring to FIG. 7, the hierarchical codebook 130 may include three levels. Although the hierarchical codebook 130 of FIG. 7 illustrates three levels, the hierarchical codebook 130 may include any number of levels greater than one. Each level indicates a set of codebook entries detailing a next higher level. For example, the codebook entries associated with level 1 include four codewords. Each codeword associated with level 1 includes 2 bits. At level 2, each codeword associated with level 1 includes four codewords. Each codeword associated with level 2 includes 4 bits. Similarly, at level 3, each codeword associated with level 2 includes four more codewords. Each codeword associated with level 3 includes 8 bits. Therefore, within each level, the resolution of the codebook is increased by a factor of four.

$B'<B$ bits are used to index $2^{B'}$ codewords within a given level, and the remaining $B-B'$ bits are used to traverse between groups. B indicates the total number of feedback bits per interval. B' indicates the number of bits for a particular level. Referring to FIG. 7, the hierarchical codebook with 3 levels is indexed using a total of B=3 bits. B'=2 bits selects the codebook within a group of 4 codewords, and the remaining 1 bit indicates an "up" or "down" transition between levels.

Referring to FIG. 7, the second codebook (e.g., codebook of level 2) depends on the selection of a first code vector from a first codebook (e.g., codebook of level 1). A functional description of the codeword generation may be as follows:

$$w=w_a \circ w_b \text{ and } w_a \in CB_a, w_b \in CB_b.$$

For example, a composition operation is performed between vectors $w_b$ and $w_a$ in the user 110 after retrieval of the codewords $w_b$ and $w_a$ from the storage space. Vectors $w_b$ and $w_a$ are vectors within a codebook 130. Each of the Vectors $w_b$ and $w_a$ includes codewords represented by $CB_a$ and $CB_b$, respectively. The composition operation may include an element-wise multiplication. In the element-wise multiplication, the matrices must have the same number of rows and columns and the corresponding elements are element-wise multiplied with each other.

According to an embodiment of the present invention, hierarchical codebooks 130 may be effectively compressed by defining each codeword as the element-wise product of codewords drawn from different "parent" codebooks. In this embodiment, the base station 105 signals an indicator of a level of the hierarchy and a set of indicators indicating a set of matrices from among the matrices comprising the indicated level. The set of indicators may be a bitmap. Based on the indicator and the set of indicators indicating the set of matrices, the user 110 obtains the set of hierarchical codebooks based on an element-wise product of the set of indicators indicating the set of matrices that comprise the indicated level. The indication of the level together with the bitmap specifies a subset of codebook entries specifying a codebook.

"Children" codewords for any codeword $w_1 \in C_1$ of a parent level may be obtained based on Equation 1, listed below.

Equation 1: $w_2=w_1 \circ w_g$, where $w_g \in G$ is an element of the parent codebook G.

$C_1$ may denote the 4 codewords of a parent level (e.g., level 1), and the 4 "children" codewords (e.g., level 2) may be obtained as the element-wise product $w_2=w_1 \circ w_g$, where $w_g \in G$ is an element of the parent codebook G.

As the number of levels of the hierarchy is increased, an arbitrarily large number of matrices are formed. By then selecting an arbitrary subset of the matrices at a particular level, any arbitrary codebook can be designed.

For example, the base codebook may include matrices with close spacing in the direction of a highest probability of a location of the user 110, and at least one matrix with a relatively more distant spacing in the outer regions on either side of the believed location of the user 110. This increases the robustness of the codebook against mobility of the user 110. The signaling required in such an approach would consist only of a single integer indicating the level of the hierarchical codebook from which the set of matrices should be selected, and a bitmap of length equal to the number of matrices at that level.

Although the embodiments described above illustrate a base station signaling a set of indicators to a user, embodiments of the present invention also include the situation where the user signals the set of indictors to the base station. For example, a first station may signal a set of indicators to a second station, and the second station may signals a set of indicators to the first station. Subsequently, the codebook may be derived at the first station or the second station.

Variations of the embodiments of the present invention are not to be regarded as a departure from the spirit and scope of the embodiments of the invention, and all such variations as would be apparent to one skilled in the art are intended to be included within the scope of this invention.

What is claimed is:

1. A system for transmitting a precoding codebook over an air interface, the system comprising:
a first station configured to signal a set of indicators via more than one antenna to a second station from which the entire precoding codebook is derived at the second station based only on the signaled set of indicators, the set of indicators including less information than the precoding codebook,
wherein the set of indicators includes a first set of codewords such that a second set of codewords is derived at the second station by a mirror operation based on symmetries associated with the more than one antenna.

2. The system of claim 1, wherein the set of indicators includes a sub-set of complex elements of the precodirig codebook, wherein each complex element of the sub-set has a predefined magnitude or phase.

3. The system of claim 1, wherein the set of indicators includes a sub-set of complex elements of the precoding codebook, wherein the complex elements of the sub-set are dependent upon each other.

4. The system of claim 3, wherein the more than one antenna includes a first antenna assigned a first antenna weight and a subsequent antenna is assigned a second weight, the second weight being a function of the first antenna weight and an antenna weight of a preceding antenna.

5. The system of claim 1, the set of indicators including a base phase for one of the plurality of antennas and an offset phase for other antennas of the plurality of antennas.

6. The system of claim 1, wherein the precoding codebook is a hierarchical codebook and the set of indicators includes an indicator indicating a level of a hierarchy and a set of matrices among matrices comprising the indicated level.

7. The system of claim 1, wherein the precoding codebook is a hierarchical codebook and the set of indicators includes an indicator to a first codebook and at least one indicator to at least one other codebook such that the hierarchical codebook can be derived based on a composition operation between the indicator to the first codebook and the at least one indicator to the at least one other codebook.

8. The system of claim 1, wherein the first station is a base station and the second station is a user device.

9. A system for receiving a precoding codebook over an air interface from a first station, the system comprising:
    a second station configured to derive the entire precoding codebook based only on a set of indicators received at the second station from more than one antenna at the first station, the set of indicators including less information than the precoding codebook,
    the set of indicators includes a first set of codewords such that a second set of codewords is derived at the second station by a mirror operation based on symmetries associated with the more than one antenna.

10. The system of claim 9, wherein the second station derives the precoding codebook from the set of indicators being a sub-set of complex elements of the precoding codebook, wherein each complex element of the sub-set has a predefined magnitude or phase.

11. The system of claim 9, wherein the second station derives the precoding codebook from the set of indicators being a sub-set of complex elements of the precoding codebook, wherein the complex elements of the sub-set are dependent upon each other.

12. The system of claim 9, wherein the precoding codebook is a hierarchical codebook and the second station derives the hierarchical codebook from the set of indicators being an indicator indicating a level of a hierarchy and a set of matrices among matrices comprising the indicated level.

13. The system of claim 9, wherein the precoding codebook is a hierarchical codebook and the set of indicators includes an indicator to a first codebook and at least one indicator to at least one other codebook, wherein the second station derives the hierarchical codebook based on a composition operation between the indicator to the first codebook and the at least one indicator to the at least one other codebook.

14. A method for transmitting a precoding codebook over an air interface from a first station, the system comprising:
    signaling a set of indicators from the first station via more than one antenna to a second station from which the entire precoding codebook is derived at the second station based only on the signaled set of indicators, the set of indicators including less information than the precoding codebook,
    wherein the set of indicators includes a first set of codewords such that a second set of codewords is derived at the second station by a mirror operation based on symmetries associated with the more than one antenna.

15. The method of claim 14, wherein the set of indicators includes a sub-set of complex elements of the precoding codebook, wherein each complex element of the sub-set has a predefined magnitude or phase.

16. The method of claim 14, wherein the set of indicators includes a sub-set of complex elements of the precoding codebook, wherein the complex elements of the sub-set are dependent upon each other.

17. The method of claim 14, wherein the precoding codebook is a hierarchical codebook and the set of indicators includes an indicator indicating a level of a hierarchy and a set of matrices among matrices comprising the indicated level.

18. The method of claim 14, wherein the precoding codebook is a hierarchical codebook and the set of indicators includes an indicator to a first codebook and at least one indicator to at least one other codebook such that the hierarchical codebook can be derived based on a composition operation between the indicator to the first codebook and the at least one indicator to the at least one other codebook.

19. A method for receiving a precoding codebook over an air interface from a first station, the method comprising:
    deriving at a second station the entire precoding codebook based only on a set of indicators received at the second station from more than one antenna at the first station, the set of indicators including less information than the precoding codebook,
    the set of indicators includes a first set of codewords such that a second set of codewords is derived at the second station by a mirror operation based on symmetries associated with the more than one antenna.

20. The method of claim 19, wherein the deriving step includes deriving the precoding codebook from the set of indicators being a sub-set of complex elements of the precoding codebook, wherein each complex element of the sub-set has a predefined magnitude or phase.

21. The method of claim 19, wherein the deriving step includes deriving the precoding codebook from the set of indicators being a sub-set of complex elements of the precoding codebook, wherein the complex elements of the sub-set are dependent upon each other.

22. The method of claim 19, wherein the precoding codebook is a hierarchical codebook and the deriving step includes deriving the hierarchical codebook from the set of indicators being an indicator indicating a level of a hierarchy and a set of matrices among matrices comprising the indicated level.

23. The method of claim 19, wherein the precoding codebook is a hierarchical codebook and the set of indicators includes an indicator to a first codebook and at least one indicator to at least one other codebook, wherein the deriving step derives the hierarchical codebook based on a composition operation between the indicator to the first codebook and the at least one indicator to the at least one other codebook.

* * * * *